Figure 1:
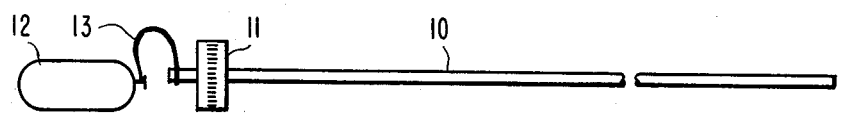

United States Patent [19]

Tagesson

[11] Patent Number: 4,663,962

[45] Date of Patent: May 12, 1987

[54] METHOD AND A DEVICE FOR DETECTING LEAKAGE OF A TUBE SECTION

[75] Inventor: Leif Tagesson, Gothenburg, Sweden

[73] Assignee: Protronic AB, Lules, Sweden

[21] Appl. No.: 843,716

[22] Filed: Mar. 25, 1986

[30] Foreign Application Priority Data

Apr. 2, 1985 [SE] Sweden .................. 8501632

[51] Int. Cl.⁴ .............................................. G01M 3/22
[52] U.S. Cl. .................................................. 73/40.7
[58] Field of Search ....................................... 73/40.7

[56] References Cited

U.S. PATENT DOCUMENTS 4,450,711 5/1984 Claude .......................... 73/40.7 X

FOREIGN PATENT DOCUMENTS 5028 4/1969 Japan ..................... 73/40.7

Primary Examiner—Stewart J. Levy
Assistant Examiner—Joseph W. Roskos
Attorney, Agent, or Firm—Woodard, Weikart, Emhardt & Naughton

[57] ABSTRACT

A device for detecting leakage of a tube section communicating with atmosphere at a first end comprises gas filling and flow measuring apparatus for filling the tube section from a second end with a known gas. Pump apparatus is arranged for conveying the resulting gas contents between the ends back towards and through the second end. Gas concentration measuring and recording apparatus is located at the second end for recording the concentration of the known gas in the gas contents with respect to time.

11 Claims, 6 Drawing Figures

METHOD AND A DEVICE FOR DETECTING LEAKAGE OF A TUBE SECTION

The present invention relates to a method and a device for detecting leakage in a tube section, communicating with atmosphere at a first end thereof.

Several methods are known for detecting leaks in tubes or tube systems. Generally these methods require the two ends of the tube to be sealed to a very high degree of tightness, for the purpose of allowing pressurizing tests or other detecting methods. Such high degree of tightness may be very difficult to attain, making the detecting operation time consuming.

The object of the present invention is to provide a method and a device for detecting leakage that considerably simplifies the detecting operation as compared with earlier known methods and devices.

For this purpose the method according to the invention is characterized by filling said tube section from a second end thereof with a known gas, and thereafter conveying the resulting gas contents between said first and second ends back towards and through said second end while continuously recording the concentration of said known gas in said gas contents with respect to time.

For the same purpose the device according to the invention comprises means for filling said tube section from a second end thereof with a known gas, and is characterized by pump means for conveying the resulting gas contents between said ends back towards and through said second end, and gas concentration measuring and recording means located at said second end for recording the concentration of said known gas in said gas contents with respect to time.

Figure 2:
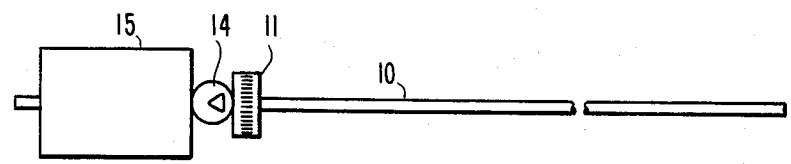
Figure 3:
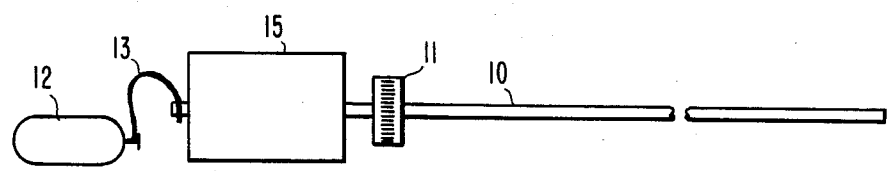
Figure 4:
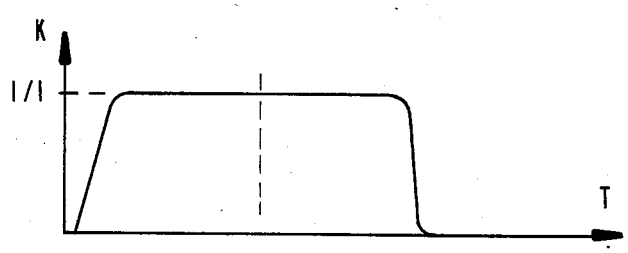
Figure 5:
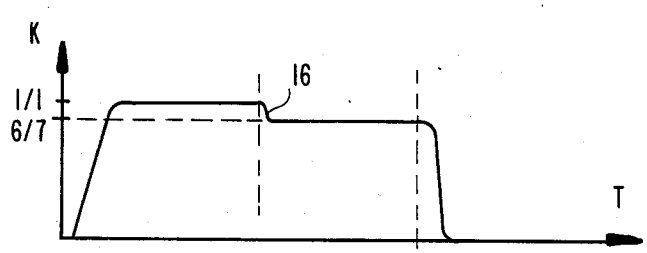
Figure 6:
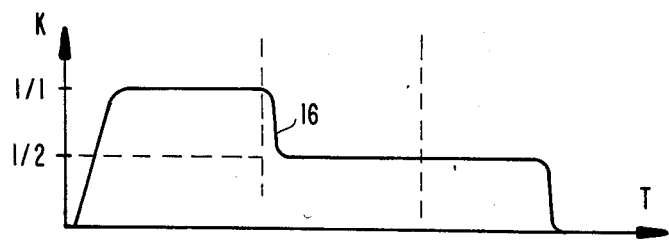

The invention will be more closely described below with reference to the attached drawings, on which FIG. 1 is a schematic side view of a tube section with associated gas filling and flow measuring apparatus for illustrating a first step of the detecting method according to the invention, FIG. 2 in a similar view illustrates a second step of the method, wherein said gas filling apparatus has been replaced by gas concentration measuring and recording means and a pump, FIG. 3 is a view similar to those of FIGS. 1 and 2 illustrating one embodiment of a device according to the invention, and FIGS. 4–6 are graphs obtained by the device according to the invention for illustrating different types of leakage situations.

FIG. 1 illustrates a tube section 1 to be tested with respect to leakage. A flow meter 11 is connected to one end of the tube section 10. To the same end a gas container 12 is connected via a hose 13, in series with the flow meter 11. The container 12 contains a known gas, which can e.g. be a gas mixture with a known mixture ratio. Although not shown, the opposite end of the tube section 10 communicates freely with the atmosphere.

In the first step of one embodiment of the method according to the invention the tube section 10 is filled in excess with the known gas, whereupon the gas container 12 and the hose 13 are disconnected. Thereafter a gas pump 14 and a gas concentration measuring and recording instrument 15 are connected in series with the flow meter 11. By means of the pump 14 the gas contents between the two ends of the tube section 10 are pumped back with a controlled flow through the instrument 15. The gas concentration recording and measuring instrument 15 is of a type recording the concentration of the above-mentioned known gas continuously as the gas passes through the instrument. The result can e.g. be visually recorded on a plotter, not shown, or fed into digital memory device for control purpose. The instrument 15 may be of a type known per se, and need therefore not be described more closely here. Thus, an absorption band analyzing instrument of the type marketed under the mark BINOS by Leybold-Heraeus GmbH, Hanau, can be used. Other instruments are, however, also available on the market.

The measurement values obtained from the apparatus 15 may be used to establish whether the tube section 10 contains any leakage. If no leak is present the concentration of said known gas will be maintained on a constant level, until all of said known gas has passed back through the apparatus 15, said concentration then rapidly falling to zero. FIG. 4 is a graph illustrating the variation of the concentration K of the known gas as the gas contents between the two ends of the tube section illustrated in FIG. 2 passes the apparatus 15. As can be seen the concentration steeply rises to a maximum value when the known gas comes into the apparatus 15. The concentration level is maintained until all the gas has passed the instrument 15, the concentration then falling rapidly to zero, as described above.

Now, suppose that the tube section 10 of FIG. 2 would have a small leak at approximately half of its length between the two ends thereof, the measuring result would be that schematically illustrated in FIG. 5. As shown, the extension of the curve is identical to that of FIG. 4 during approximately the first half thereof. During this half the apparatus 15 measures the same concentration of the known gas as in FIG. 4. At the point 16, air, or the like, leaking into the tube section due to said small leak has reched the apparatus 15. The result is that a lower concentration of the known gas in the gas mixture passing through the apparatus 15 will be recorded, as indicated by the fall at 16 of the curve. Just as an example, it has been assumed in FIG. 5 that the concentration of the known gas falls from its maximum level to 6/7 of said maximum concentration. Due to the fact that the gas mixture passing through the apparatus 15 has been diluted by the gas introduced through the leak, the total gas volume passing through the apparatus 15 will be greater than in the example according to FIG. 4. This is illustrated by the fact that the final fall of the curve in FIG. 5 appears later than in FIG. 4. In FIG. 5 the rightmost vertical broken line is intended to be in line with the deep fall of the curve in FIG. 4, to illustrate more clearly the above-mentioned fact that the total gas volume has increased due to the leak.

Assuming the same conditions as in FIG. 4 and 5 with respect to the volume of known gas led into the tube section 10 of FIG. 1, FIG. 6 is intended to illustrate what happens if the leak located between the ends of the tube section 10 would have been greater than in FIG. 5. Since the known gas is here still more diluted than in FIG. 5 the fall at 16 extends to a lower level. Just as an example it has been supposed that the level is on ½ of the original concentration of the known gas. Likewise, since the volume of the gas mixture passing through the apparatus 15 has been still more increased, due to the greater leak, than in FIG. 5, the curve on said lower level finally falls to zero still later than in FIG. 5. A comparison between FIGS. 5 and 6 thus illustrates the influence of a single leak approximately in the middle between the two ends of the tube section 10 as said leak becomes greater.

If the tube section 10 illustrated in FIGS. 1 and 2 has more leaks along its length it is apparent that the apparatus 15 would record this as a stepwise lowering of the concentration of the known gas with time, the number of such steps being the same as the number of leaks. By comparing the positions of said steps along the curve and the levels of the successive parts of the curve, the positions of the leaks along the tube section 10 can be determined.

From the above it should have been apparent that with one single measurement as described it is possible to determine leakage, the number of leaks, the magnitudes of the leaks and the positions thereof along the known length of the tube section. Likewise, it would be possible to measure the whole length of a tube section with the method according to the invention provided that said section does not contain any leaks. The result would be the curve in FIG. 4.

In FIG. 3 an embodiment of the device according to the invention is illustrated, in which the same reference numberals have been used to indicate the same or similarly operating details as in FIGS. 1 and 2. As shown, the gas container 12, via the hose 13, the apparatus 15 and the meter 11 are connected in series to the left hand end of the tube section 10. Here the apparatus 15 also measures and records the concentration of the known gas when fed into the tube section 10. By this the exact concentration of a known gas may be established during filling of the tube section 10.

The flow meter 11 primarily has the function of supervising the gas filling and extracting steps, so as to obtain an indication if the gas flow changes for some reason, e.g. due to change of the pump function. In the embodiments as illustrated the flow meter 1 also has the function of sealing the tube section against atmosphere at the measuring end. The flow meter can e.g. be of the type known through DE-P No. 3048096.7.

The known gas referred to above can be one of a number of different gases or gas mixture. The choice of gas is determined by the type of measuring instruments, as 15, and it should preferably be neither explosive nor poisonous. Among gases, that can be used in connection with the above mentioned analyzing instrument, CO, $CO_2$, $SH_2$, CNHM.

Suitably the device according to the invention should be calibrated by means of a known reference tube before inspection of an unknown tube section. In that connection it may also be required to compensate for the actual temperature.

What is claimed is:

1. A method for detecting leakage of a tube section communicating with atmosphere at a first end thereof, characterized by filling said tube section from a second end thereof with a known gas, and thereafter conveying the resulting gas contents between said first and second ends back towards and through said second end while continuously recording the concentration of said known gas in said gas contents with respect to time.

2. A method according to claim 1, characterized by recording the concentration of said known gas during filling thereof into said tube section.

3. A method according to claim 2, characterized by sealing said tube section at said second end against atmosphere at least during the step of recording the concentration of said known gas in said gas contents with respect to time.

4. A method according to claim 3 characterized by filling said tube section in excess of said known gas.

5. A method according to claim 4 characterized by indicating the presence and magnitude of a leak by indicating a change of concentration and the magnitude of said change, respectively, when performing the step of said recording of the concentration of said known gas in said gas contents with respect to time.

6. A method according to claim 5, characterized by also indicating the position of said leak along said tube section by indicating said change of concentration.

7. A method according to claim 5, characterized by indicating the length of said tube section by indicating a final fall in the concentration of said known gas.

8. A device for detecting leakage of a tube section communicating with atmosphere at a first end thereof, comprising means for filling said tube section from a second end thereof with a known gas, characterized by pump means for conveying the resulting gas contents between said ends back towards and through said second end, and gas concentration measuring and recording means located at said second end for recording the concentration of said known gas in said gas contents with respect to time.

9. A device according to claim 8, characterized by flow measuring means located at said second end for supervising the gas flow.

10. A leak detecting apparatus comprising:
    a tube with a first opening and a second opening spaced therefrom and normally opened to the surrounding environment;
    gas storage means connected to said first opening and operable to direct gas contained therein through said first opening and into said tube toward said second opening to a leakage location between said first opening and said second opening;
    pump means operable to force said gas directed into said tube by said gas storage means back from said leakage location through said first opening and out of said tube; and
    gas measuring means at said first opening operable to receive and measure said gas exiting said first opening to detect a leak at said leakage location.

11. The apparatus of claim 10 wherein:
    said gas storage means is a container of gas initially connected to said tube at said first opening with said pump means and said gas measuring means connected to said tube at said first opening upon removal of said gas storage means therefrom, said pump means forcing said gas from said first opening into said gas measuring means.

* * * * *